United States Patent [19]
Ward

[11] 3,828,243
[45] Aug. 6, 1974

[54] APPARATUS AND METHOD FOR ELECTROMAGNETIC GEOPHYSICAL EXPLORATION

[75] Inventor: Stanley H. Ward, Salt Lake City, Utah

[73] Assignee: Varian Associates, Palo Alto, Calif.

[22] Filed: Aug. 30, 1971

[21] Appl. No.: 175,905

Related U.S. Application Data

[63] Continuation-in-part of Ser. No. 725,605, May 1, 1968, abandoned.

[52] U.S. Cl. .................... 324/0.5 R, 324/6, 324/4
[51] Int. Cl. ..................... G01n 27/78, G01v 3/16
[58] Field of Search............. 324/0.5 R, 0.5 G, 4, 6, 324/8

[56] References Cited
UNITED STATES PATENTS

| | | | |
|---|---|---|---|
| 3,015,060 | 12/1961 | McLaughlin | 324/4 |
| 3,105,934 | 10/1963 | Barringer | 324/4 |
| 3,150,313 | 9/1964 | Dehmelt | 324/0.5 |
| 3,395,338 | 7/1968 | Barringer | 324/6 |
| 3,443,208 | 5/1969 | Webb | 324/0.5 |
| R23,769 | 1/1954 | Varian | 324/0.5 |
| 3,042,857 | 7/1962 | Ronka | 324/4 |
| 3,108,220 | 10/1963 | Ruddock | 324/4 |

Primary Examiner—Michael J. Lynch
Attorney, Agent, or Firm—Stanley Z. Cole; Gerald M. Fisher

[57] ABSTRACT

The frequency range, particularly at lower frequencies and sensitivity of conventional electromagnetic geophysical exploration apparatus is improved by provision of an optically pumped alkali-vapor magnetometer in place of the conventional induction coil receiver. The magnetometer provides a frequency modulated output precession signal as a function of the intensity of a time-varying secondary magnetic field produced by a time-varying primary magnetic field. The magnetometer output is substantially independent of the frequency of the magnetic field being measured over the frequency range of primary interest. The time-varying primary magnetic field is also used to develop a reference signal which when combined with a signal from the magnetometer results in the development of the in-phase and quadrature components of the time-varying secondary magnetic field for use in determining the parameters of conductivity, permittivity and permeability of geophysical bodies under investigation.

7 Claims, 8 Drawing Figures

INVENTOR.
STANLEY H. WARD

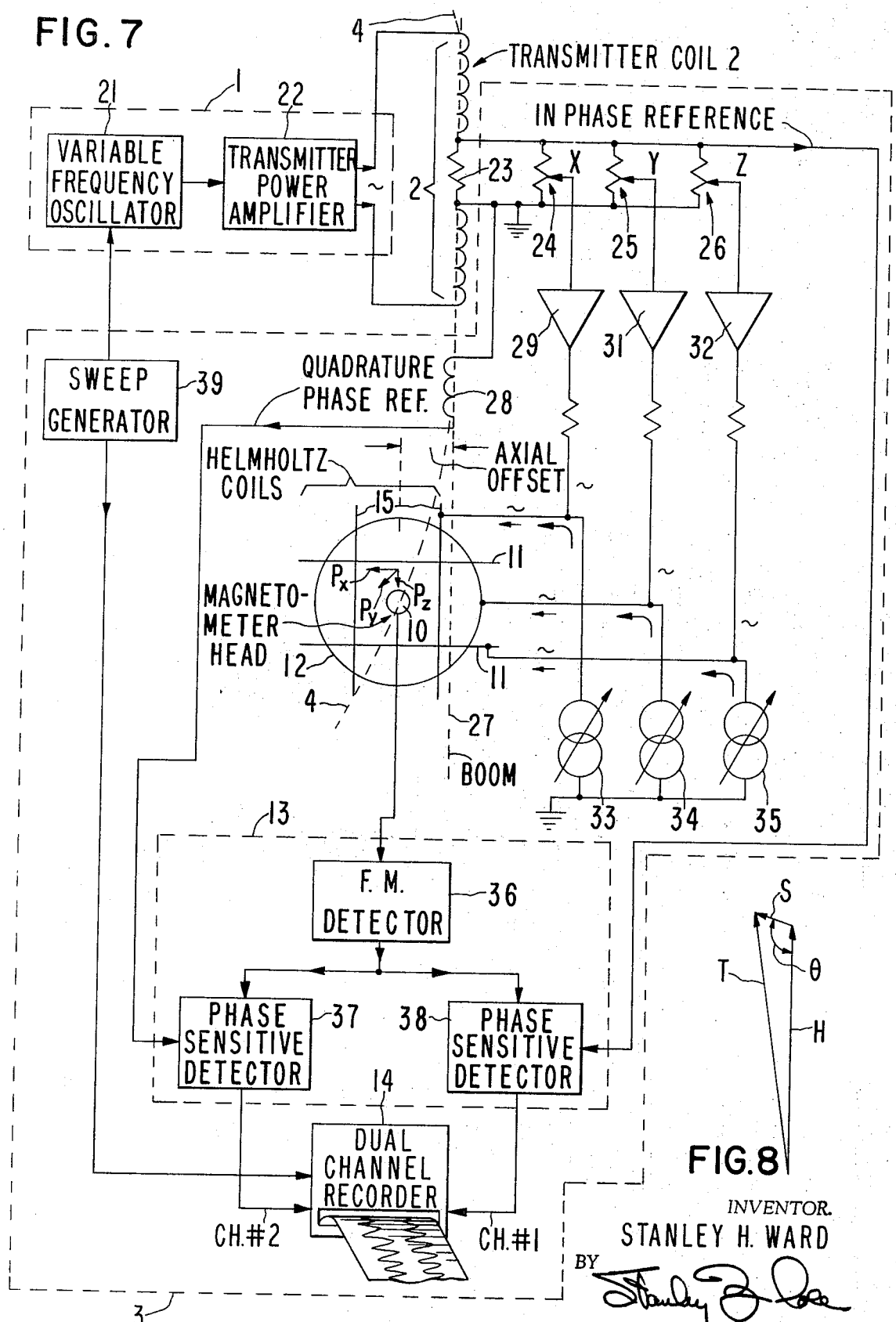

APPARATUS AND METHOD FOR ELECTROMAGNETIC GEOPHYSICAL EXPLORATION

RELATED CASES

The present application is a continuation-in-part application of parent application U.S. Ser. No. 725,605 filed May 1, 1968, now abandoned, and assigned to the same assignee as the present invention, now abandoned in favor of the resent application.

BACKGROUND OF THE INVENTION

The present invention relates in general to geophysical exploration. More specifically it relates to an improved method and apparatus for use in electromagnetic geophysical exploration wherein secondary time-varying magnetic fields are detected, measured and recorded.

As is quite well known in geophysical exploration by electromagnetic techniques, a primary field is generated, generally at one or two discrete frequencies, by artificial means such as a transmitter, or by natural means such as atmospheric disturbances. The primary field links the earth giving rise to eddy currents in conductive bodies located therein at the same frequency but usually somewhat out-of-phase with the primary field. These eddy currents in turn create a secondary time-varying magnetic field which is detected, measured and recorded. The recorded information is then analyzed by electronic equipment at the time of recording or at a later time by means of computers.

Conventional apparatus used for detecting, measuring and recording the secondary field comprises generally a large loop antenna, which provides a detected output voltage, $e = j\mu\omega N_R A_R H$, which is proportional to the frequency of the detected field. To offset the decrease in $e$ as the frequency $\omega$ decreases, the turns-area product of the receiver, $N_R A_R$, or the detected field strength $H$ must be increased. For most applications, particularly airborne, the increase in weight inferred by either an increase in $N_R A_R$ or $H$ becomes prohibitive below about 100 Hz.

Depending on the character, size and depth below the surface of the geophysical bodies under investigation, the in-phase and quadrature components of the secondary magnetic field are detectable within different frequency ranges. In general for large and deeply buried bodies; the frequency range is far below the 100 Hz now practically useable with conventional apparatus.

Since the determination of the electrical parameters of subterranean bodies, including conductivity, dielectric permittivity and magnetic permeability, requires the measurement of both in-phase and quadrature components of the secondary fields, it becomes highly desirable to have available a method and apparatus for making these measurements at any frequency.

It is further highly desirable to have available a method and apparatus for measuring the in-phase and quadrature components of the secondary magnetic fields over a continuous extended frequency range to provide a more complete profile of the electrical parameters of the geophysical bodies under investigation, in particular, the dielectric constant which is frequency dependent.

SUMMARY OF THE INVENTION

A primary object of the present invention is, therefore, an improved method and apparatus for detecting, measuring and recording time-varying magnetic fields at frequencies much lower than the 100 Hz heretofore practical with conventional apparatus.

Another object of the present invention is an improved method and apparatus for use in electromagnetic geophysical exploration for detecting, measuring and recording the in-phase and quadrature components of secondary time-varying magnetic fields over an extended and continuous frequency range.

A primary feature of the present invention is improved electromagnetic geophysical exploration apparatus utilizing a novel receiver for detecting, measuring and recording the magnitude of the in-phase and quadrature components of secondary time-varying magnetic fields at lower frequencies than heretofore practical.

Another feature is the same as the preceding feature wherein the receiver is an atomic resonance magnetometer operable to detect time-varying magnetic fields at frequencies as low as 0 Hz.

Another feature of the present invention is the same as any of the preceding features wherein said atomic resonance magnetometer is operable to produce an output signal as a function of the magnitude of the in-phase and quadrature components of a secondary time-varying magnetic field over an extended and continuous range of frequencies.

Another feature of the present invention is the same as any one or more of the preceding features wherein said atomic resonance magnetometer is an optically pumped and/or monitored alkali-vapor magnetometer adapted to detect, measure and record the direction as well as the magnitude of secondary time-varying magnetic fields.

Another feature of the present invention is the same as any one or more of the preceding features wherein said atomic resonance magnetometer is an optically pumped and/or monitored helium magnetometer adapted to detect, measure and record the direction as well as the magnitude of secondary time-varying magnetic fields.

Other objects, features and advantages of the present invention will become apparent in the detailed description below when considered in connection with the accompanying drawings.

BRIEF DESCRIPTION OF THE DRAWINGS

FIG. 7 is a schematic line diagram, partly in block diagram form, depicting an electromagnetic geophysical exploration system incorporating features of the present invention, and FIG. 8 is a vector diagram depicting the time varying signal component of magnetic field superimposed on a DC bias field, such as the earth's field.

DETAILED DESCRIPTION OF THE INVENTION

Figure 1:
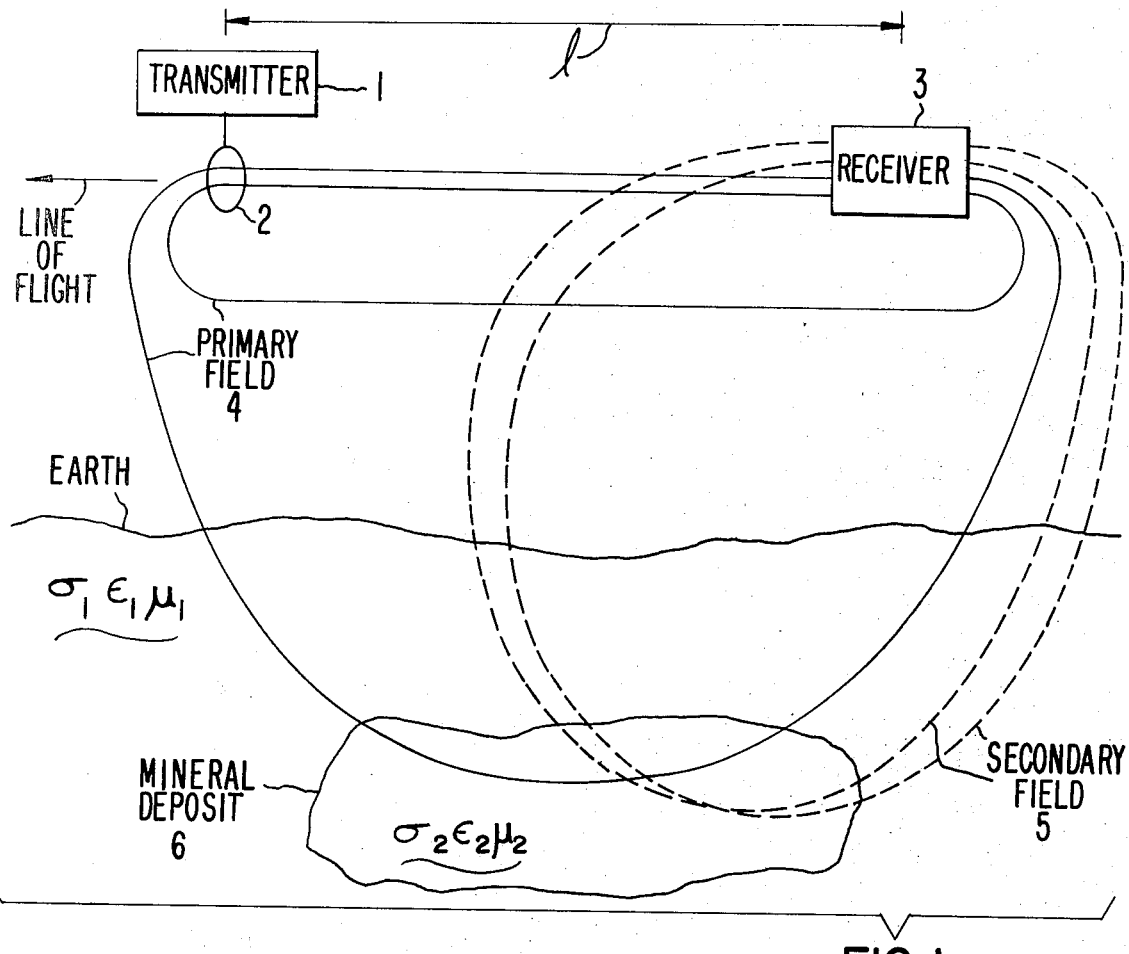
FIG. 1 is a diagrammatic view of a system incorporating the present invention.

In FIG. 1 there is shown diagrammatically an airborne configuration of a system embodying the present invention. A transmitter 1 together with an appropriate antenna 2, such as a loop, is caused to be carried over the surface of the earth along a predetermined line of flight. A receiver 3 is spaced apart from transmitter 1 and may be either mounted on the same framework as transmitter 1 or towed separately from transmitter 1 on an extended cable supported by an aircraft. Any conventional arrangement of transmitter 1 and receiver 3 may be adopted. It should be further understood, however, that either the transmitter 1 or the receiver 3 or both may be carried on the ground or in a ship as desired.

In operation, transmitter 1 generates a primary time-varying magnetic field 4, shown in solid lines, which is directed at and caused to link with the earth and, depending on its depth, any conducting body 6 located therein, such as for example, a massive sulfide deposit. As a result, eddy currents are induced in the conductive body 6. These eddy currents, in turn, give rise to a secondary time-varying magnetic field 5, shown in dashed lines, which extends in all directions and links receiver 3.

While the frequency of the secondary field 5 is the same as the frequency of primary field 4, it is generally somewhat out-of-phase with respect to primary field 4 due to the inductive and capacitive reactance of the conducting body 6. By measuring the magnitude of the in-phase and quadrature components of the secondary field 5, the electrical parameters, such as the conductivity $\sigma$, dielectric permitivity $\epsilon$, and magnetic permeability $\mu$ of the conductive bodies, may be determined.

Figure 2:
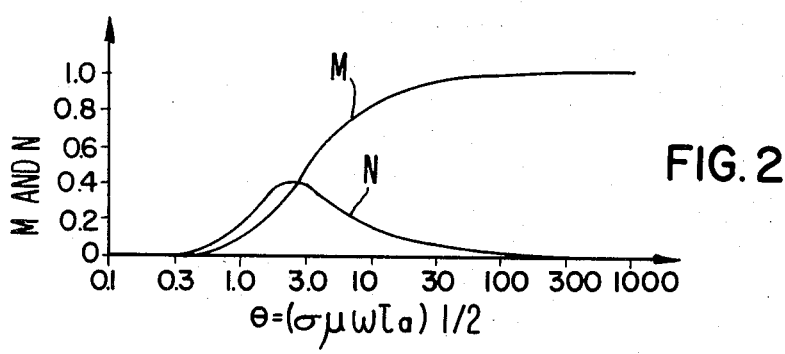
FIG. 2 is a diagram of the real (M) and imaginary (N) parts of the reflection coefficient of a disk as a function of its induction number.

Referring to FIG. 2, there is shown a typical diagram of the relative magnitude of the in-phase (M) and quadrature (N) components of a secondary magnetic field for a conducting body in the shape of a disk as a function of its induction number, $\theta = (\sigma \mu \omega t a)^{1/2}$ where $\sigma$ is the conductivity, $\mu$ is the magnetic permeability, $\omega$ is the frequency in radians and $t$ and $a$ are in thickness and area of the body respectively.

While the curves for the relative magnitude of the in-phase (M) and quadrature (N) components of the secondary field are somewhat different for bodies of differing geometric shapes of primary importance is that all of them commonly exhibit a range of frequencies for a given conductivity, permeability and size within which there exists both an in-phase and quadrature component sufficiently large to be detected. In FIG. 2, this would correspond to the range $\theta = 1$ to $\theta = 30$. Thus it can be seen from FIG. 2 that when the conductivity, permeability or size of the body under investigation is large, the frequency of the secondary field must of necessity be lower in order that the investigation is made within that range of frequencies for which there exists a detectable in-phase and quadrature component of the secondary field.

Implicit in the curves of FIG. 2 and in particular, in the curve of the in-phase component (M) in the region of a high induction number $\theta$, is the result of the well known skin effect. As may be recalled, the currents in any given body flow nearer the outside surface of the body as the frequency increases, such that in a perfectly conducting body all of the eddy currents induced in the body would flow at the very surface thus completely precluding any penetration whatever of the conducting body by the primary field. In contrast, for a body of given conductivity, greater penetration by the primary field may be obtained at lower and lower frequencies.

In this regard, some of the more valuable subterranean deposits, such as copper sulfide, are highly conductive, very massive and buried at great depths. For these reasons, it becomes extremely desirable to carry on geophysical exploration at frequencies sufficiently low enough to enable the detection of both the in-phase and quadrature components of the secondary field.

Figure 3:
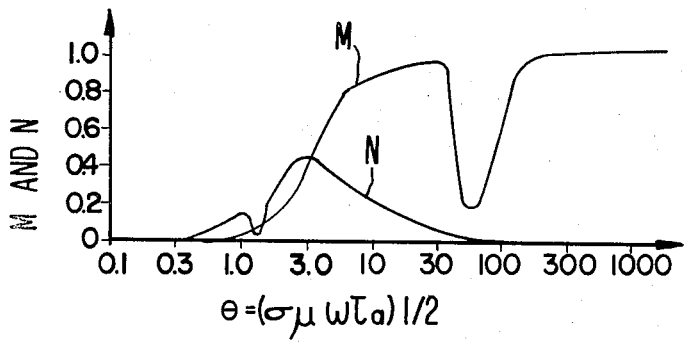
FIG. 3 is a somewhat modified form of FIG. 2 showing the effects of a geophysical dielectric or capacitive parameter.

Referring to FIG. 3, a set of typical curves of the in-phase and quadrature components of a secondary magnetic field are shown in a somewhat modified form from that shown in FIG. 2. The irregularities in curves M and N, noted as relatively large changes in amplitude of the in-phase and quadrature components is a result of the dielectric or capacitive parameter of geophysical bodies. Unlike the conductivity $\sigma$ the permeability $\mu$, the dielectric constant giving rise to the changes is a complex function of the frequency of the primary and secondary magnetic fields. Since both valuable and commercially worthless mineral deposits exhibit the same conductivity, permeability and size, it is highly important to determine as well the dielectric constant of the bodies under investigation. Due to the frequency dependency of the dielectric constant it becomes even more desirable to measure the magnitude of the in-phase and quadrature components of the secondary field over an extended range of frequencies as well as the lower frequencies.

Figure 4:
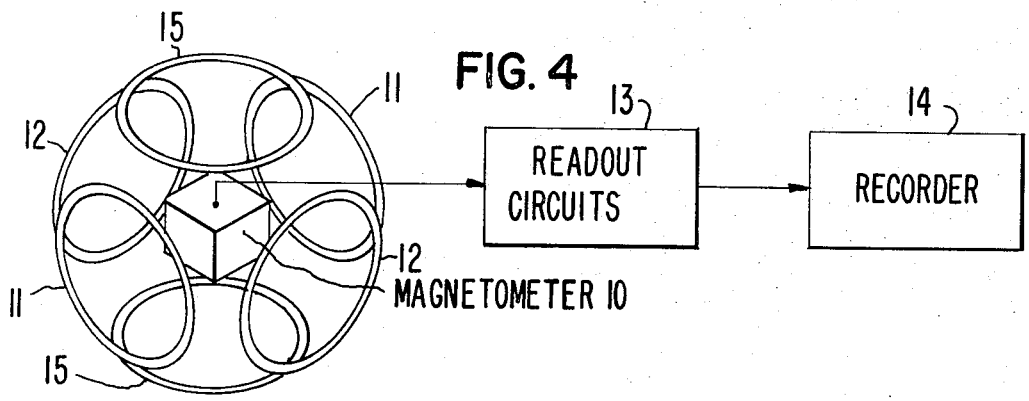
FIG. 4 is a schematic diagram of the receiver of the present invention together with its biasing coils.
Figure 5:
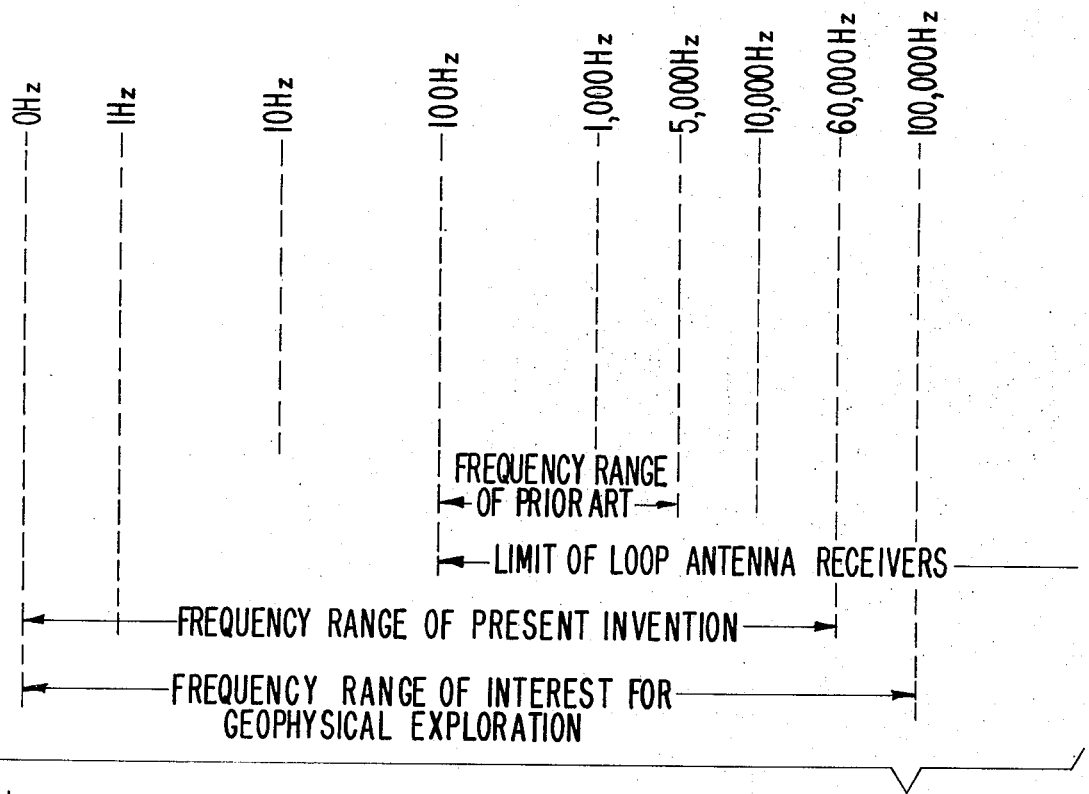
FIG. 5 is a diagram of frequency ranges relating to geophysical exploration apparatus.

Referring now to FIGS. 1, 4 and 5, the secondary magnetic field 5 is detected, measured and recorded by receiver 3 comprising a nuclear resonance magnetometer 10 which provides an output signal the frequency of which is a function of the intensity of the secondary field 5. The output of magnetometer is then coupled to a readout circuit 13 and a recorder 14 which may be any well known circuit suitable for this purpose. In contrast to prior known receivers whose frequency dependency restricts operation to frequencies above 100 Hz, as shown in FIG. 5, magnetometer 10 provides an output signal which is substantially independent of the primary field frequency over the entire frequency range of interest in geophysical exploration from 0 Hz to over 60,000 Hz.

Magnetometer 10 may be, for example, a proton precession magnetometer, but for reasons given presently, it is preferably an optically pumped and/or monitored alkali-vapor magnetometer such as more fully descirbed in U.S. Pat. No. 3,150,313, or an optically pumped and/or monitored helium magnetometer.

The proton precession magnetometer, more fully described in U.S. Pat. No. Re.23,769, provides an output precession signal of about 2,000 Hz in an average earth's static field of 50,000 gammas, whereas the output precession signal of an optically pumped alkali-vapor magnetometer is in the vicinity of 200,000 Hz in a static field of the same intensity. Thus for a given change in field intensity, the frequency excursion of the output of the alkali-vapor magnetometer involves many more precession cycles than would be reflected in the output of the proton precession magnetometer. This feature of the alkali-vapor magnetometer becomes particularly important in cases, such as encountered in electromagnetic geophysical exploration, where the period or frequency of the change in a time-varying magnetic field may approach the precession period or frequency of the proton precession magnetometer. It is possible, then, to detect changes in magnetic field intensity having periods as low as 50 microseconds.

The response of magnetometer 10 to the intensity of the magnetic field 5 rather than the rate of change of said intensity, as is the case in prior known induction coil receiving apparatus, is particularly advantageous in those cases in which the output of the transmitter 1 is pulsed instead of continuous.

Figure 6:
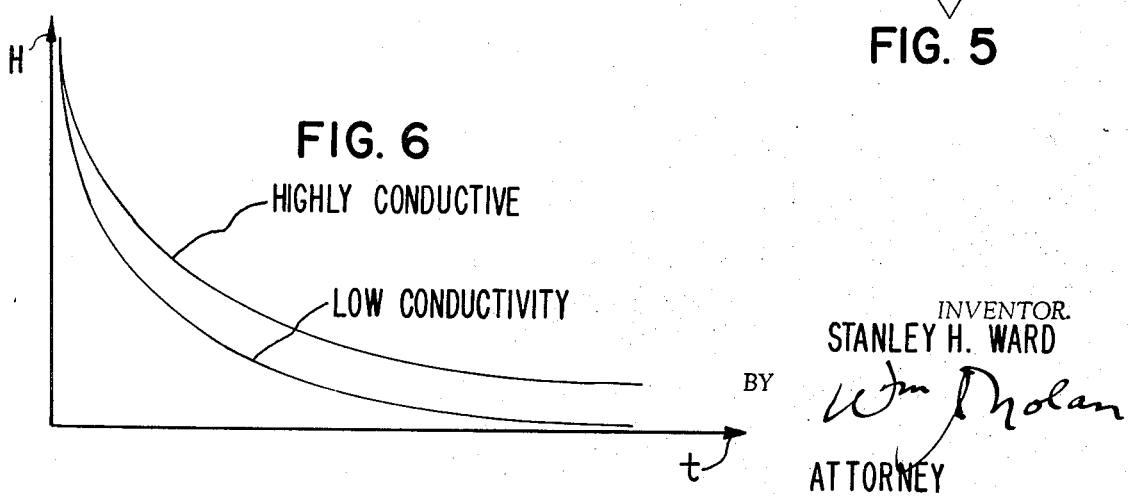
FIG. 6 is a diagram of the relative decay of secondary magnetic fields generated in highly conductive and low conductive geophysical bodies.

Due to the reactance of geophysical bodies under investigation, the eddy currents, and therefore the secondary magnetic field 5, decay exponentially as shown in FIG. 6. For the more valuable highly conductive bodies in which the inductance is high, the rate of change of the secondary field intensity is much lower.

In prior known induction coil receiving apparatus, the lower rate of change results in a much lower output signal than is desirable. Magnetometer 10 of the present invention, however, not only measures the total intensity of the magnetic field 5 but does so over substantially the entire frequency range of interest as the intensity decays. This feature provides an easy means for obtaining a continuous profile of the response of geophysical bodies, in particular highly conductive bodies, to primary time-varying fields over a frequency range not heretofore practical.

As a scalar device, magnetometer 10 measures that component of the time-varying secondary magnetic field along the direction of the earth's static magnetic field. The earth's field exhibits a magnitude of about 50,000 gammas.

Since the eddy current distribution and hence the direction of the secondary field 5 is a function of the geometry of the body under investigation, it is often desirable to measure the magnitude of the secondary field 5 along a predetermined direction. This may be accomplished by establishing a strong unidirectional magnetic bias field in the vicinity of the magnetometer 10 orientated in the direction along which the magnitude of the secondary field is desired to be measured.

Referring to FIG. 4, a strong magnetic bias field, for example, 100 times greater than the earth's static magnetic field of 50,000 gammas, is provided by means fo three pair of orthogonally disposed Helmholtz coils, 11, 12 and 15. DC current is caused to circulate in one or more of the coil pairs in any conventional manner such that there results a large DC magnetic bias field in the desired direction.

Since a part of the primary field 4 also links magnetometer 10 as shown in FIG. 1, the Helmholtz coils 11, 12 and 15 may be used to bias magnetometer 10 to cancel the primary field. This, of course, requires that the distance *l* between transmitter 1 and receiver 3 be maintained at a known value in order that the in-phase component of the secondary field 5 may be distinguished from the primary field 4. While any well known means may be used for this purpose, mounting the transmitter 1 and receiver 3 on a rigid boom 27 is suggested as an appropriate technique for this purpose.

Referring now to FIGS. 7 and 8, the electromagnetic induction geophysical exploration system of FIGS. 1 and 4 is shown in greater detail. More particularly, the transmitter 1 includes a variable frequency oscillator 21 for providing a source of AC signals covering the frequency range of interest, as shown in FIG. 5, namely, from 0 Hz to 60,000 Hz. The output of the variable frequency oscillator is fed to the input of a transmitter power amplifier 22 wherein it is amplified for energizing the transmitter coil 2. The transmitter coil 2 includes a reference resistor 23 connected in series with the coil to derive an in-phase reference voltage thereacross. The reference voltage has a frequency corresponding to the frequency of the energy fed to the coil 2 and is in-phase with the current fed through the coil 2.

Three reference potentiometers 22, 25 and 26, designated X, Y and Z, are connected in parallel with the reference resistor 23 for deriving three reference voltage outputs of a magnitude variably controlled by the setting of the respective potentiometers 24–26, such reference voltages being in-phase with the current through the transmitter coil 2. The voltages derived from the potentiometers 24–26 are to be utilized for canceling the primary magnetic field in the magnetometer head 10, as more fully disclosed below.

The magnetometer head 10 is mounted on a boom 27 having the transmitter coil 2 mounted at one end thereof and the magnetometer head 10 mounted at the other end thereof in the conventional manner as disclosed in U.S. Pat. No. 3,108,220. The boom holds the magnetometer head 10 in a fixed position relative to the position of the transmitter coil 2 such that no relative movement is obtained between the transmitter coil 2 and the magnetometer head 10, even in severe vibrational environments.

A quadrature phase reference pickup coil 28 is carried on the boom adjacent the transmitter coil 2 for picking up a signal having a phase 90° out of phase with the current through the transmitter coil 2 in the conventional manner as disclosed in U.S. Pat. No. 3,108,220. The quadrature phase signal derived from coil 28 will be employed in the receiver 3 as more fully disclosed below.

Three sets of Helmholtz coils 11, 12 and 15 are coaxially aligned with respective ones of three mutually orthogonal axes, with the magnetometer head 10 positioned at the intersection of the three orthogonal axes. The Helmholtz coils are utilized for two functions. In a first function, a sample of the in-phase reference signal is fed to the coils for cancelling out the primary field produced by transmitter coil 2 in the magnetometer head 10.

If the magnetometer head 10 were perfectly aligned with the axis of the transmitter coil 2 only one component of the primary magnetic field would be produced. More specifically, only a component $P_z$ coaxial with the transmitter coil would be produced in the magnetometer head 10. However, from a practical point of view, it is extremely difficult to achieve precise alignment of the magnetometer head 10 with the axis of the transmitter coil 2. Accordingly, the primary field 4 passing through the magnetometer head 10 will have components $P_x$, $P_y$, and $P_z$ in each of the three orthogonal directions.

These three orthogonal primary magnetic field components may be cancelled by the three sets of orthogonally related Helmholtz coils 11, 12 and 15. Cancellation of the three primary magnetic field components is achieved by converting the in-phase reference voltages derived from potentiometers 24, 25 and 26 to AC currents having amplitudes corresponding to the amplitude of the respective voltages derived from the respective potentiometers 24–26. The voltages are converted to current via the intermediary of operational amplifiers 29, 31 and 32, respectively. The respective current outputs of operational amplifiers 29–32 are fed to separate ones of the pairs of Helmholtz coils. More particularly, the X-reference output from operational amplifier 29 is fed to energize Helmholtz pair 15 axially aligned in the X-direction, the Y-output current from operational amplifier 31 is fed to Helmholtz coil pair 12 which is coaxially aligned with the Y-axis and the Z-reference output from operational amplifier 32 is fed to Helmholtz pair 11 axially aligned in the Z-direction.

Thus, the AC primary field is completely cancellable in the magnetometer head 10 by separately and independently adjusting potentiometer 24–26 for a minimum signal output as recorded on the recorder 14. This calibration or adjustment is preferably made by taking the aircraft with its prospecting system to an altitude to be sufficiently removed from the vicinity of a conducting ore body such that the secondary magnetic field reflected back to the magnetometer head 10 is of negligible amplitude. The output of channel 1 of the recorder, i.e., the in-phase component is then monitored and the potentiometers 24, 25 and 26 adjusted for a minimum output on the in-phase channel, i.e., channel 1 of the recorder 14.

The electromagnetic prospecting system is then brought into electromagnetic energy exchanging relation with the earth and ore bodies therein for detection of such ore bodies. The primary magnetic field 4 from the transmitter links the earth and any ore body therein within the primary field. The primary field 4 induces an eddy current in the ore body. The eddy current has associated therewith a secondary magnetic field S of a frequency the same as that of the primary field to be detected by the magnetometer head 10.

Referring now to FIG. 8, the mode of operation of the magnetometer 10 will be more fully disclosed. The secondary magnetic field S constitutes a vector small in comparison to the vector of the earth's field H, such earth's field vector typically being on the order of 50,000 gammas. The magnetometer measures the magnitude of the total magnetic field, i.e., the vector sum of H and S. The vector sum is indicated by vector T in FIG. 8. The earth's field $H$ is relatively constant and the small secondary magnetic field vector $S$ forms a time varying function superimposed upon $H$. The resultant field $T$ can be expressed as:

$$T = (H^2 + S^2 - 2HS \cos \theta)^{1/2}$$

where $\theta$ is the angle between $\overline{H}$ and $\overline{S}$ or $$T = H[1 + (S^2/H^2) - 2(S/H) \cos \theta]^{1/2}$$

or $$T \approx H(1 - S/H \cos \theta + 1S^2/2H^2 + \ldots)$$

since $S$ is $<< H$, $T \approx (H - S/H \cos \theta)$ or $$T \approx H - S \cos \theta$$

Since the magnetometer measures $T$ it will only be able to detect that component of the secondary field, $S$, that is parallel to the large ambient field $H$. Hence, any desired directional component of $S$ can be measured by simply injecting into the three component coil system (Helmholtz coils 11, 12 and 15) the DC currents required to generate a large ambient field vector in the direction of interest. For example, if the transverse horizontal component of $S$ is desired to be measured one need only generate a strong field (10 times the earth's field) in the Helmholtz set coaxially aligned with the horizontal direction, namely the X-coils 15. Three DC current generators 33, 34 and 35 are connected to the respective Helmholtz coils 15, 12 and 11 for energizing same with a DC current to generate a bias DC magnetic field in any desired direction. The DC generators 33–35 are variable for producing a controlled magnitude of the respective DC magnetic field component. The DC generators 33–35 need not be utilized if one is not interested in the particular direction of the secondary magnetic field $S$, as the system will measure the magnitude of the secondary field $S$ which is in the direction of the earth's field due to the aforedescribed cosine law.

The secondary magnetic field vector $S$ is varying with time in accordance with the frequency of the transmitter 22 to produce a frequency modulation of the output precession frequency of the magnetometer head 10. More particularly, the precession frequency output of the magnetometer head 10 will have a carrier frequency, corresponding to the magnitude of the earth's field H or DC bias field, which is frequency modulated at the frequency of the secondary field $S$, namely, the frequency of the variable frequency oscillator 21. The frequency deviation is proportional to the magnitude of that ocmponent of the secondary magnetic field $S$ which is in the direction of the earth's field $H$ or DC bias field.

The output of the magnetometer head 10 is fed to the input of an FM detector 36 which separates the FM signal component and converts it into an AM component having an amplitude proportional to that component of the secondary field S to be measured. The output of the FM detector 36 is fed to a pair of phase sensitive detectors 37 and 38 for phase detection against the quadrature-phase reference and the in-phase reference respectively to produce DC outputs fed to channels No. 2 and No. 1. The DC outputs correspond to the amplitude of the quadrature and in-phase components of the secondary magnetic fields.

The secondary magnetic field in-phase and out-of-phase components are recorded as a function of time or as a function of the frequency of the variable frequency oscillator 21. The latter is accomplished by sweeping the frequency of the variable frequency oscillator 21 with an output derived from a sweep generator 39. The in-phase and out-of-phase signals are recorded in recorder 14 as a function of the sweep signal derived from sweep generator 39 such that the in-phase and out-of-phase signals are correlated with the frequency of the transmitter. The magnitude of the secondary magnetic field $S$ is generally less than 1 gamma and the system of the present invention is suitable for measuring the amplitude of the secondary magnetic field $S$ to values of a few thousandths of a gamma.

Electromagnetic induction prospecting systems are well known. See for example, chapters 15, 16, 17 and 18 of a text titled, "Interpretation Theory in Applied Geophysics" McGraw-Hill Book Co., 1965, pages 444–572. Although the system of FIGS. 1, 4 and 7 employ a transmitter for generating the primary magnetic field, the primary magnetic field may be generated by natural atmospheric disturbances. A system employing natural disturbances as the source of the primary field is disclosed in the aforecited text at page 459.

Since may changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electromagnetic geophysical exploration system including means for generating a varying current to a primary radiator for providing a primary magnetic field for coupling with the earth, the frequency of said varying current being a function of time, apparatus for installation on a moving craft, said apparatus including means for detecting and measuring the intensity of a time-varying secondary magnetic field responsive to said varying primary magnetic field, an optically pumped, optically monitored nuclear resonance magnetometer, said magnetometer being coupled to said craft such that, in use, the positional relationship between said primary magnetic field generating means and said magnetometer is known at all times, variable magnetic field generating means including Helmholtz coil means to provide an accurately controllable magnetic vector in a confined space interior of said Helmholtz coil means, said controllable magnetic vector being substantially adjustable in any direction within said confined space, said magnetometer being positioned within said confined space, means coupled with said Helmholtz coils and responsive to said current in said radiator for producing a cancelling magnetic field vector within said confined space, which cancelling vector is equal and opposite to said primary magnetic field, said means for producing said cancelling magnetic field vector includes a plurality of variable circuit elements, each said variable circuit element having a variable voltage output which is in phase with said current in said radiator, and means for measuring said time-varying secondary magnetic field, said measuring means including an FM detector being connected to said magnetometer output.

2. In apparatus of the type of claim 1 wherein said means for producing said cancelling magnetic field vector includes a resistor in series with said radiator for providing said primary magnetic field.

3. In the apparatus of claim 1 wherein said means for measuring said time-varying secondary magnetic field wherein the output of said FM detector is connected to an in-phase detector and a quadrature phase detector, which phase detectors are connected to a recorder.

4. In the apparatus of claim 1 wherein said variable magnetic field generating means includes means for generating a unidirectional magnetic bias field substantially greater than the intensity of the earth's field.

5. In the apparatus of claim 4 wherein said means for generating a unidirectional magnetic bias field includes three pairs of orthogonal Helmholtz coils disposed about said confined space, said coils being selectively energizable.

6. A method of measuring secondary magnetic fields due to geophysical structures in the presence of a primary magnetic field created by current in a primary radiator comprising: causing the frequency of said current to vary as a function of time; locating an optically pumped, optically monitored nuclear resonance magnetometer within a confined space between the windings of a Helmholtz coil positionally fixed in a craft with respect to the position of said primary radiator positioning said craft in a location where said secondary fields are non-existent; generating in said Helmholtz coil a magnetic field equal and opposite to a component of said primary field in said confined space by providing a driving signal to said coil, which driving signal is derived from a signal having an in-phase relation to said current in said primary radiator such that substantially all response of said magnetometer to said primary magnetic field component is avoided; FM detecting the output of said magnetometer while operating said craft in regions having secondary magnetic fields.

7. The method of claim 6 wherein said detecting step includes frequency demodulating the magnetometer output, and phase detecting the in-phase and quadrature components of said secondary magnetic field.

* * * * *